(12) United States Patent
Yamasaki et al.

(10) Patent No.: US 8,672,378 B2
(45) Date of Patent: Mar. 18, 2014

(54) MULTI-FINGERED TYPE HAND DEVICE

(71) Applicant: Honda Motor Co., Ltd., Tokyo (JP)

(72) Inventors: Yasuhiro Yamasaki, Saitama (JP);
Hironori Waita, Saitama (JP); Satoki Matsumoto, Saitama (JP); Masayoshi Kokusho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/664,997

(22) Filed: Oct. 31, 2012

(65) Prior Publication Data

US 2013/0106128 A1    May 2, 2013

(30) Foreign Application Priority Data

Nov. 2, 2011  (JP) ................................ 2011-241493

(51) Int. Cl.
*B25J 15/02*    (2006.01)
(52) U.S. Cl.
USPC ............... 294/198; 294/907; 901/33; 901/37; 901/39; 700/245
(58) Field of Classification Search
USPC ............ 294/106, 213, 192, 198, 907; 623/64, 623/63; 901/33, 39, 37, 46; 700/245, 258, 700/260
See application file for complete search history.

(56) References Cited

U.S. PATENT DOCUMENTS

| 5,447,403 | A | * | 9/1995 | Engler, Jr. ........................ 414/4 |
| 5,501,498 | A | * | 3/1996 | Ulrich ............................ 294/106 |
| 6,896,704 | B1 | * | 5/2005 | Higuchi et al. .................. 623/64 |
| 7,168,748 | B2 | * | 1/2007 | Townsend et al. ............ 294/106 |
| 8,442,678 | B2 | * | 5/2013 | Ichikawa et al. .............. 700/245 |
| 8,459,711 | B2 | * | 6/2013 | Hayakawa et al. ........... 294/198 |
| 8,463,434 | B2 | * | 6/2013 | Takahashi ..................... 700/245 |
| 8,562,049 | B2 | * | 10/2013 | Ihrke et al. .................... 294/106 |
| 2005/0121929 | A1 | * | 6/2005 | Greenhill et al. ............. 294/106 |
| 2010/0259057 | A1 | * | 10/2010 | Madhani ....................... 294/106 |

FOREIGN PATENT DOCUMENTS

| JP | 2007-007833 | | 1/2007 | |
| JP | 4645897 | B2 * | 3/2011 | ................ B25J 9/06 |
| JP | 2011-067932 | | 4/2011 | |

* cited by examiner

*Primary Examiner* — Saul Rodriguez
*Assistant Examiner* — Gabriela Puig
(74) *Attorney, Agent, or Firm* — Rankin, Hill & Clark LLP (57) ABSTRACT

Provided is a multi-fingered type hand device that facilitates arrangements of wirings connecting driving members which drive fingertips and the like of a robot with members which control the driving members. The multi-fingered type hand device 1 includes a wrist portion 10, a base portion 20, and a plurality of finger mechanisms 30, the wrist portion 10 having therein a wrist sensor 12, at least one of the plurality of finger mechanisms 30 having therein a fingertip sensor 321, the base portion 20 including a frame-shaped frame portion 21, a tactile sensor 25, a first substrate 23 that controls outputs of the wrist sensor 12, the fingertip sensor 321, and the tactile sensor 25, and a second substrate 24, the first substrate 23 and the second substrate 24 being disposed opposite to each other so as to sandwich the frame portion 21 from the upper and lower.

4 Claims, 5 Drawing Sheets

MULTI-FINGERED TYPE HAND DEVICE

TECHNICAL FIELD

The present invention relates to a multi-fingered type hand device that mimics a hand of a human being.

BACKGROUND ART

Recently, there has been known a multi-fingered type hand device that mimics a hand of a human being. This kind of multi-fingered type hand device has a base portion corresponding to a palm and a back of the hand and a plurality of finger mechanisms respectively corresponding to five fingers of a human being.

As such a multi-fingered type hand device, for example in Patent Document 1, there has been proposed a lower arm assembly for a humanoid robot. The lower arm assembly has a wrist actuator, a finger actuator, a lower arm control device that controls driving of the wrist actuator and the finger actuator, and a DC power regulator that supplies a voltage-controlled power to electronic devices which are disposed in the lower arm portion and in the hand.

In Patent Document 2, there has been proposed a robot device that has a plurality of actuators disposed at portions having a degree of freedom in an arm portion unit, a sub-control unit for controlling individual actuators disposed at a shoulder portion of the arm portion unit, and a main control unit that sends control commands to the sub-control unit.

CITATION LIST

Patent Literature

{Patent Document 1}
Japanese Patent Application Publication No. 2011-067932 (see FIGS. 3 and 4A)
{Patent Document 2}
Japanese Patent Publication No. 4645897 (see FIG. 4)

SUMMARY OF INVENTION

Technical Problem

However, in technologies proposed in Patent Document 1 and Patent Document 2, a control unit and the like are disposed at positions away from the actuators. The control unit and the like control operations of the actuators that drive the fingers, wrists, and the like, and control voltage supplied to each member. As a consequence, there have been possibilities that wirings which connect the actuators with the control unit and the like become so long that arrangements of the wirings are difficult and the wirings are damaged or disconnected by operations of a robot.

The present invention is devised in view of the problems mentioned above, and intended to provide a multi-fingered type hand device that facilitates the arrangements of the wirings which connect the driving members with the controlling members. The driving members drive the fingers and the like of the robot and the controlling members control the driving members.

Solution to Problem

To solve the above problems, the multi-fingered type hand device according to the present invention is configured to include a wrist portion provided on a distal end side of an arm portion, a base portion connected to the distal end of the wrist portion and provided inside an exterior of a hand, and a plurality of finger mechanisms provided extending from a distal end of the base portion, the wrist portion having therein a wrist sensor that detects a pressure from the outside, at least one of the plurality of finger mechanisms having therein a fingertip sensor that detects a pressure from the outside, the base portion including a frame-shaped frame portion, a tactile sensor accommodated inside the frame portion and detecting a contact pressure, a first substrate controlling output of the wrist sensor, output of the fingertip sensor, and output of the tactile sensor, and a second substrate, the first substrate and the second substrate being disposed opposite to each other so as to sandwich the frame portion from the upper and lower.

By the configuration of the multi-fingered type hand device as described above, the three sensors, the first substrate that controls the outputs of the three sensors, and the second substrate that converts the outputs of the three sensors, are all built inside the device. As a consequence, wirings connecting each member with each other become short, thereby facilitating the arrangements of the wirings. In addition, by the configuration that the first substrate and the second substrate are disposed opposite to each other so as to sandwich the frame portion, the multi-fingered type hand device facilitates the arrangements of the wirings with members inside of the frame portion, as compared with a case, for example, where the first substrate and the second substrate are disposed overlapping with each other at the same side of the palm or the back of the hand.

The multi-fingered type hand device according to the present invention, in which the frame portion may include a first finger mechanism support portion extending in a direction perpendicular to an extending direction of the plurality of finger mechanisms and supporting rear ends of the plurality of finger mechanisms from the upper side, and a main frame portion which is in a frame shape and connected to both ends of the first finger mechanism support portion, the main frame portion preferably including a wrist frame portion which is in an annular shape and connected to a distal end of the wrist portion, a pair of side frame portions extending in parallel with each other and in a direction of the plurality of finger mechanisms from the distal end of the wrist frame portion and respective distal ends of the side frame portions being connected to the corresponding ends of the first finger mechanism support portion, and a second finger mechanism support portion extending in a direction perpendicular to the extending direction of the finger mechanisms to connect intermediate portions between the distal ends and rear ends of the pair of side frame portions with each other and supporting the rear ends of the finger mechanisms from the lower side of the finger mechanism, the first substrate being preferably disposed at a lower position than an upper end of the main frame, and the second substrate being disposed at a higher position than a lower end of the main frame.

The multi-fingered type hand device with such a configuration accommodates therein members to reduce the thickness as well as a rigidity of the device is ensured by forming the frame portion as outer frame-shaped. In addition, the multi-fingered type hand device firmly fixes the finger mechanisms by supporting from the upper and lower the plurality of finger mechanisms provided extending to the distal end of the base portion with the first finger mechanism support portion and the second finger mechanism support portion, thereby preventing control errors, for example, caused by wobbling and the like.

In the multi-fingered type hand device according to the present invention, one of the pair of side frame portions may be formed bent upward at the end portion side of the wrist frame portion.

The multi-fingered type hand device with such a configuration ensures a space for a thumb mechanism to be driven therein by providing a bent portion at the end portion side of the wrist frame portion in the side frame portion to which the thumb mechanism among the plurality of finger mechanisms is connected.

In the multi-fingered type hand device according to the present invention, the finger mechanism may include a plurality of joint portions, around the plurality of joint portions being formed wiring paths for a signal line that connects the fingertip sensor with the second substrate, and the signal line being wired along the wiring paths.

The multi-fingered type hand device with such a configuration shortens the length of the signal line as much as possible by wiring the signal line around the joint portions, as well as the multi-fingered type hand device prevents the signal line from suffering interference with other members inside of the finger mechanisms by deflections of the signal line when the joint portions are driven.

Advantageous Effects of Invention

The multi-fingered type hand device according to the present invention facilitates the arrangements of the wirings because the members in the device are all disposed in short distances. Moreover, because the three sensors are disposed close to the substrate which controls the sensors, the multi-fingered type hand device prevents the noises from being mixed into output values of the sensors.

BRIEF DESCRIPTION OF DRAWINGS

FIGS. 4A and 4B are perspective views showing a side view of a base portion and exterior members around the base portion of a multi-fingered type hand device according to the embodiment of the present invention.

DESCRIPTION OF EMBODIMENTS

The multi-fingered type hand device according to the present invention will be explained hereinafter with reference to the drawings. For each embodiment in the following explanation, the same names and the same reference numerals are assigned for the same configurations, and the detailed explanation will be omitted as appropriate. In addition, in the drawings referenced below, sizes or shapes of members may be exaggerated, or descriptions of some configurations may be omitted for convenience of explanation.

Figure 1:
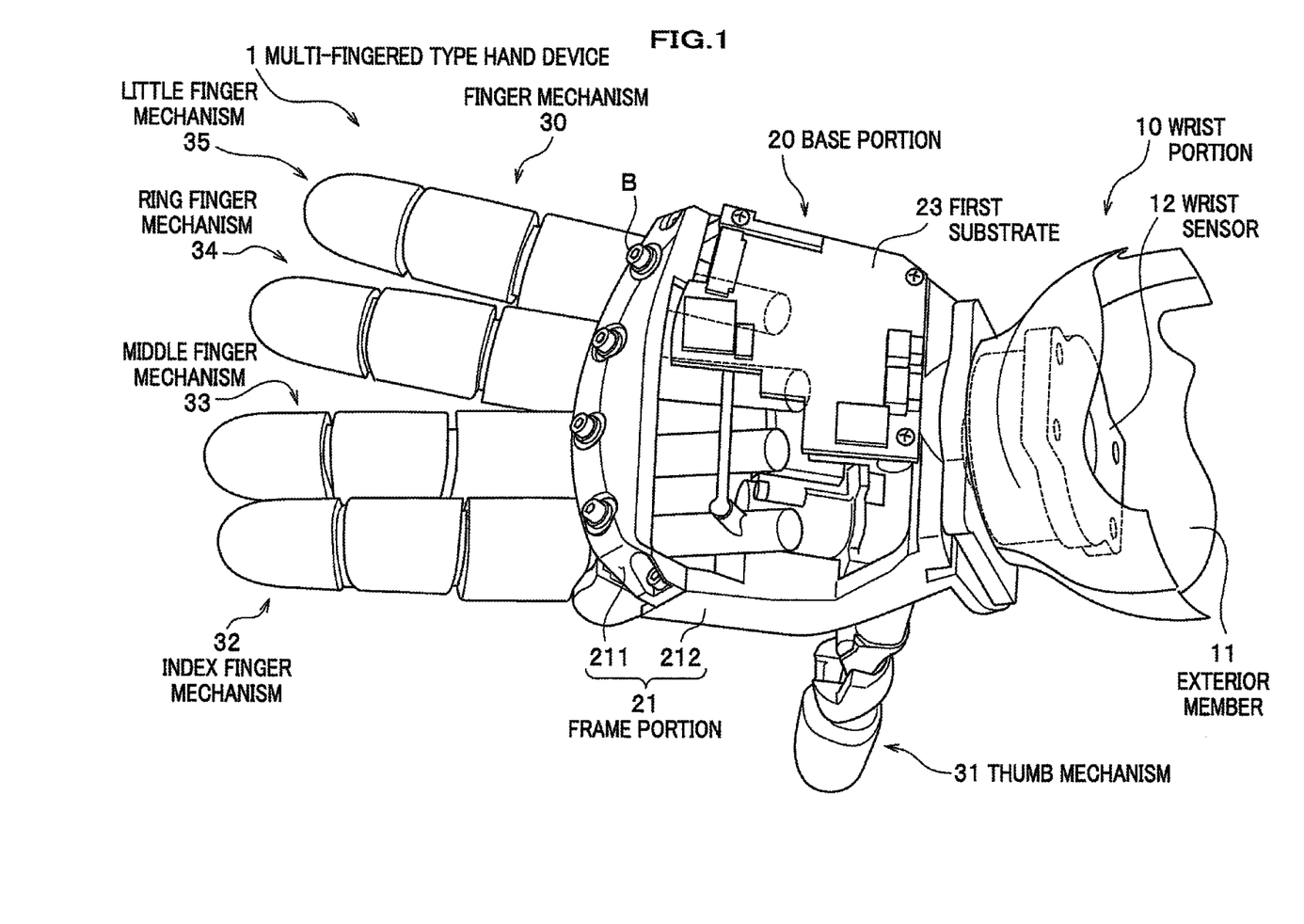
FIG. 1 is a perspective view showing a top view of a multi-fingered type hand device according to an embodiment of the present invention.

The multi-fingered type hand device 1 according to an embodiment of the present invention will be described in detail hereinafter with reference to FIGS. 1 to 5. The multi-fingered type hand device 1 is a device that is capable of performing such various operations as a human hand does, and is capable of holding, lifting, or carrying goods. The multi-fingered type hand device 1 is disposed at a distal end of an arm portion of an autonomous mobile biped robot which is not shown in drawings, and controls operation of each of finger members through two control substrates described later, in accordance with control signals inputted from a main control unit, for example, disposed in a chest portion of the robot. Here, the multi-fingered type hand device 1 includes a wrist portion 10, a base portion 20, and a finger mechanism 30 as shown in FIG. 1.

The wrist portion 10 corresponds to a human wrist. The wrist portion 10 is provided at the distal end of the arm portion not shown in drawings. The wrist portion 10 includes an exterior member 11 and a wrist sensor 12 as shown in FIG. 1.

The exterior member 11 is adapted to cover a circumference of the wrist portion 10 and to protect members inside of the wrist portion 10 from impacts and the like. The wrist sensor 12 is adapted to detect a pressure applied from the outside. More specifically, the wrist sensor 12 is constituted by a six-axis force sensor that detects three direction components Fx, Fy, and Fz of a reaction force applied to the finger mechanism 30 and three direction components Mx, My, and Mz of a moment applied to the finger mechanism 30 of the multi-fingered type hand device 1.

Figure 2:
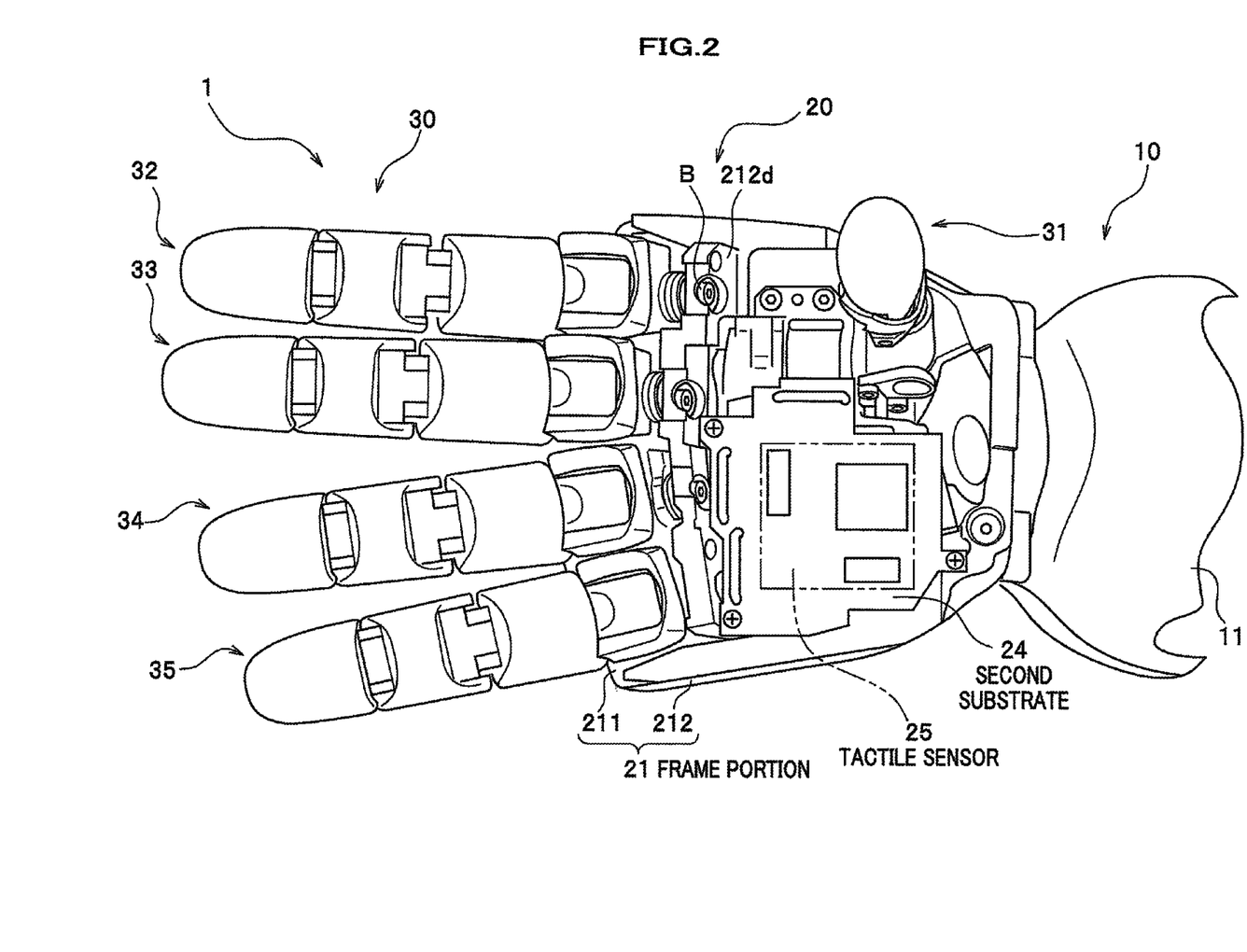
FIG. 2 is a perspective view showing a bottom view of a multi-fingered type hand device according to the embodiment of the present invention.

The base portion 20 corresponds to a palm and a back of the human hand. The base portion 20 is connected to a distal end of the wrist portion 10 as shown in FIG. 1. A circumference of the base portion 20 is covered with an exterior member in the same manner as the wrist portion 10, although the exterior member is not shown in FIG. 1. The base portion 20 has a frame portion 21, a first substrate 23, a second substrate 24, and a tactile sensor 25 as shown in FIGS. 1 and 2. The base portion 20 has therein a finger mechanism hydraulic cylinder (a first cylinder 324), however, the explanation thereof will be described later.

Figure 3:
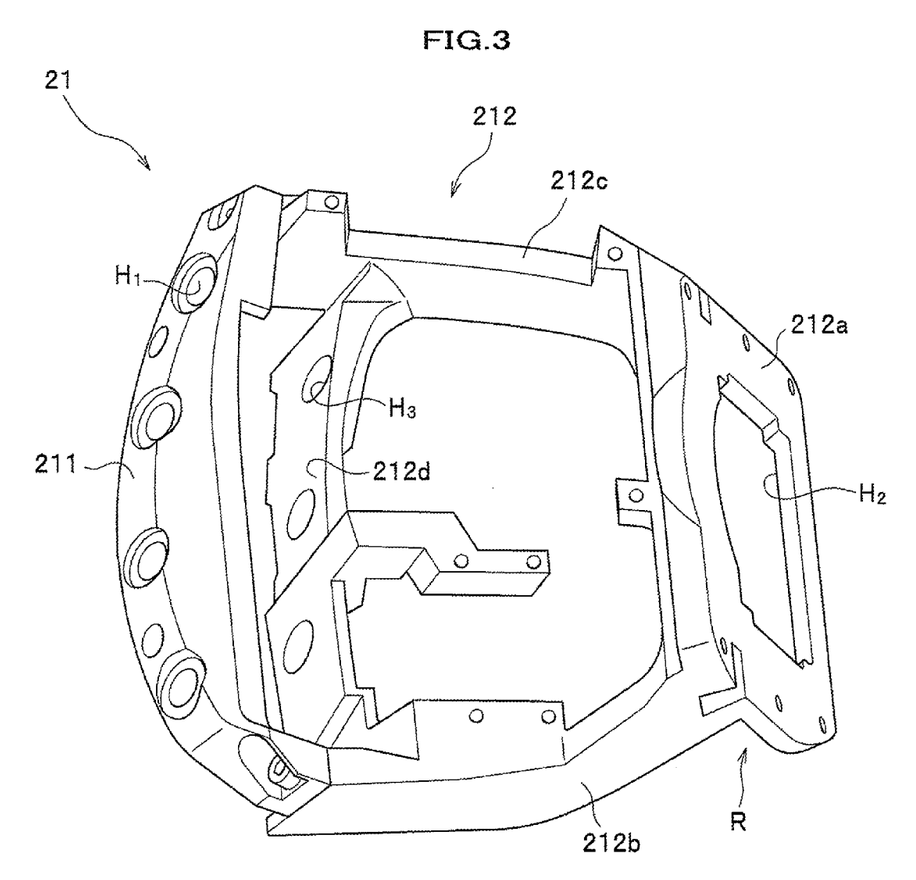
FIG. 3 is a perspective view showing a frame portion of a multi-fingered type hand device according to the embodiment of the present invention.

The frame portion 21 is adapted to be a skeleton of the base portion 20. The frame portion 21 is formed in a frame shape as shown in FIG. 3. The frame portion 21 has a first finger mechanism support portion 211 and a main frame portion 212 as shown in FIG. 3.

The first finger mechanism support portion 211 corresponds to a fist of a human hand. The first finger mechanism support portion 211 extends in a direction perpendicular to an extending direction of a plurality of finger mechanisms 30 and supports a rear end of each of finger mechanisms 30 by holding an upper side of the rear end portion as shown in FIGS. 1 and 3. The first finger mechanism support portion 211 is formed with through bores $H_1$ through which fastening members B (see FIG. 1) are inserted to fasten the rear end of each of the finger mechanisms 30 from the upper side as shown in FIG. 3.

The main frame portion 212 is adapted to be a main member of the frame portion 21. The main frame portion 212 has a wrist frame portion 212a, a side frame portions 212b, 212c, and a second finger mechanism support portion 212d as shown in FIG. 3.

The wrist frame portion 212a is formed in an annular shape and connected to the distal end of the wrist portion 10 as shown in FIG. 3. The wrist frame portion 212a is formed with a through bore $H_2$ in which the wrist sensor 12 (see FIG. 1) is fitted as shown in FIG. 3.

The side frame portions 212b, 212c are formed in parallel with each other and extend toward a direction of the plurality of finger mechanisms 30 (left side in FIG. 3) from ends of the wrist frame portion 212a, respectively as shown in FIG. 3. The side frame portions 212b, 212c have distal ends respectively connected to ends of the first finger mechanism support portion 211 as shown in FIG. 3.

The second finger mechanism support portion 212d extends in a direction perpendicular to an extending direction of each of the finger mechanisms 30 and supports the rear end of each of the finger mechanisms 30 by holding a lower side of the rear end portion as shown in FIGS. 1 and 2. In addition, the second finger mechanism support portion 212d is formed with through bores $H_3$ through which fastening members B (see FIG. 2) are inserted to fasten the rear end of each of the finger mechanisms 30 from the lower side as shown in FIG. 3.

One of the side frame portions 212b, 212c is formed with a bent portion R as shown in FIG. 3. More specifically, the side frame portions 212b, 212c includes the side frame 212b with a rear end (the end portion side of the wrist frame portion 212a) which is formed in a shape bent upward as shown in FIG. 3. Here, the rear end of the side frame 212b is a portion to which a thumb mechanism 31 among the plurality of finger mechanisms 30 is connected as shown in FIGS. 1 and 2. Therefore, the multi-fingered type hand device 1 ensures a space for the thumb mechanism 31 to be driven therein by providing such a bent portion R. The remaining configurations of the base portion 20 will be explained hereinafter going back to FIGS. 1 and 2.

The first substrate 23 is a control module (control substrate) that controls each of outputs of a plurality of sensors. More specifically, the first substrate 23 controls an output of the wrist sensor 12, an output of a fingertip sensor 321 (see FIG. 5) described later, and an output of the tactile sensor 25 described later. However, the first substrate 23 is not a unit to control the outputs of the plurality of sensors by itself, but is a sub-control unit that generates the control signals described above in accordance with the control of the main control unit (not shown), for example, disposed in the chest portion of the robot.

Figure 4A:
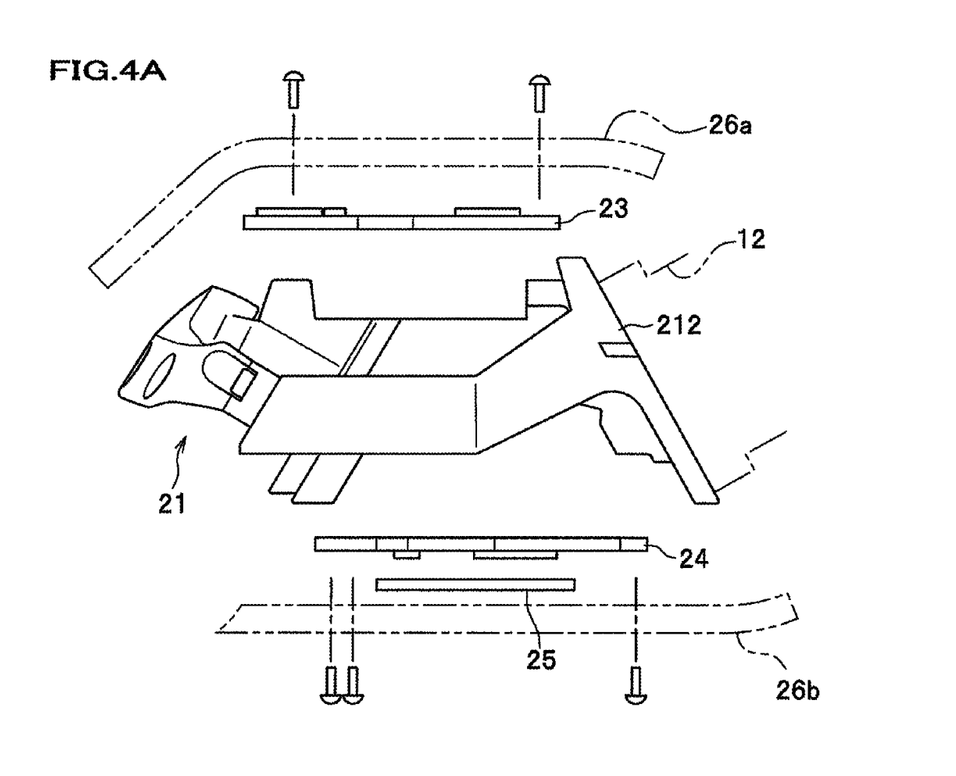
FIG. 4A is a side view showing a state in which each component is decomposed.
Figure 4B:
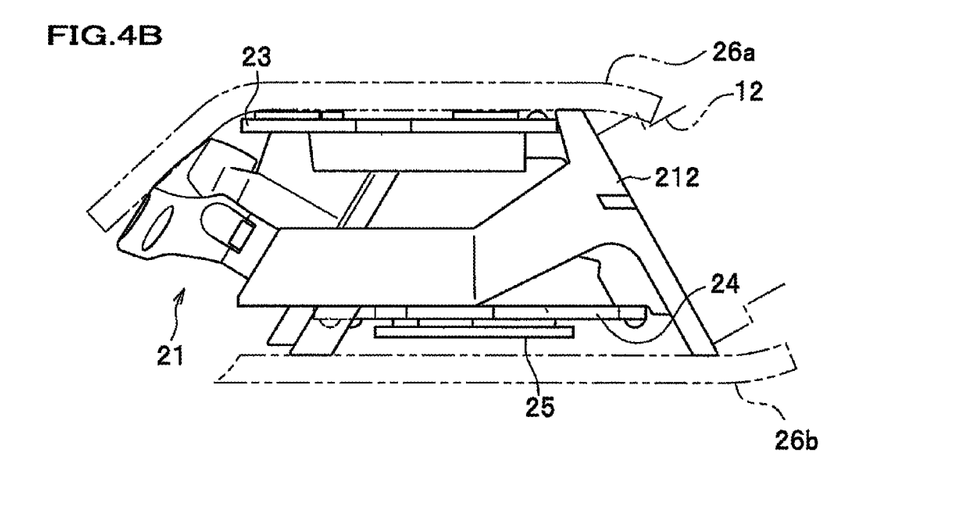
FIG. 4B is a side view showing a state in which each component is assembled.

The first substrate 23 is disposed on the upper portion of the frame portion 21 which corresponds to the back side of the hand as shown in FIGS. 1 and 4A, 4B. This means that the first substrate 23 is disposed on the top portion in the base portion 20 and directly under an exterior member 26a which covers the upper portion of the base portion 20 as shown in FIGS. 4A and 4B. In addition, the first substrate 23 is disposed inside the frame portion 21, i.e., at a lower position than the upper end of the main frame portion 212 as shown in FIG. 4B. As described above, the multi-fingered type hand device 1 has the first substrate 23 disposed inside the frame portion 21, and thus the first substrate 23 and members such as fingertip sensor 321 controlled by the first substrate 23 are closely disposed, thereby shortening wirings which connect each member with each other and facilitating arrangements of the wirings.

The second substrate 24 is a power module (digital conversion substrate) that converts the outputs of the plurality of sensors. The second substrate 24 converts the outputs of the tactile sensor 25 and other sensors disposed in the base portion 20 in accordance with the control of the main control unit (not shown) disposed in the chest portion and the like of the robot.

The second substrate 24 is disposed on the lower portion of the frame portion 21 as the palm side as shown in FIGS. 2 and 4A, 4B. This means that the second substrate 24 is disposed directly above the tactile sensor 25 described later as shown in FIGS. 4A, 4B. In addition, the second substrate 24 is disposed inside the frame portion 21, i.e., at a higher position than the lower end of the main frame portion 212 as shown in FIG. 4B. As described above, the multi-fingered type hand device 1 has the second substrate 24 disposed inside the frame portion 21, and thus the second substrate 24 and members such as fingertip sensor 321 are closely disposed, thereby shortening wirings which connect each member with each other and facilitating the arrangements of the wirings. In addition, the first substrate 23 and the second substrate 24 are disposed opposite to each other so as to sandwich the frame 21 from the upper and lower as shown in FIGS. 4A, 4B.

The tactile sensor 25 is adapted to detect a tactile pressure. The tactile sensor 25 is disposed on the lower portion of the frame portion 21 as the palm side as shown in FIGS. 2 and 4A, 4B. In other words, the tactile sensor 25 is disposed on the lowest portion of the base portion 20 and directly above an exterior member 26b which covers the lower portion of the base portion 20 as shown in FIGS. 4(a) and 4(b). This allows the tactile sensor 25 to detect the tactile pressure inputted through the exterior member 26b.

The finger mechanism 30 corresponds to a human finger. The plurality of finger mechanisms 30 are provided in the same way as human fingers and respectively provided extending from the distal end of the base portion 20 as shown in FIGS. 1 and 2. The finger mechanisms 30 are respectively fastened by a plurality of fastening members B, and are respectively fastened between the first finger mechanism support portion 211 and the second finger mechanism support portion 212d as shown in FIGS. 1 and 2. More specifically, the finger mechanisms 30 have a thumb mechanism 31, an index finger mechanism 32, a middle finger mechanism 33, a ring finger mechanism 34, and a little finger mechanism 35 as shown in FIGS. 1 and 2. The index finger mechanism 32, the middle finger mechanism 33, the ring finger mechanism 34, and the little finger mechanism 35 among the finger mechanisms 30 are respectively provided extending from the distal end of the base portion 20 as well as respectively fastened by the plurality of fastening members B between the first finger mechanism support portion 211 and the second finger mechanism support portion 212d as shown in FIGS. 1 and 2. In addition, the thumb mechanism 31 among the plurality of finger mechanisms 30 is provided extending from the lower of the base portion 20 as well as fastened to the main frame portion 212 by a fastening member not shown.

More specific configuration of the finger mechanism 30 will be explained hereinafter with reference to FIG. 5. In the following, a configuration of the index finger mechanism 32 is explained as a typical example of the plurality of finger mechanisms 30, however, other finger mechanisms such as the thumb mechanism 31, the middle finger mechanism 33, the ring finger mechanism 34, and the little finger mechanism 35 have the same configurations.

Figure 5:
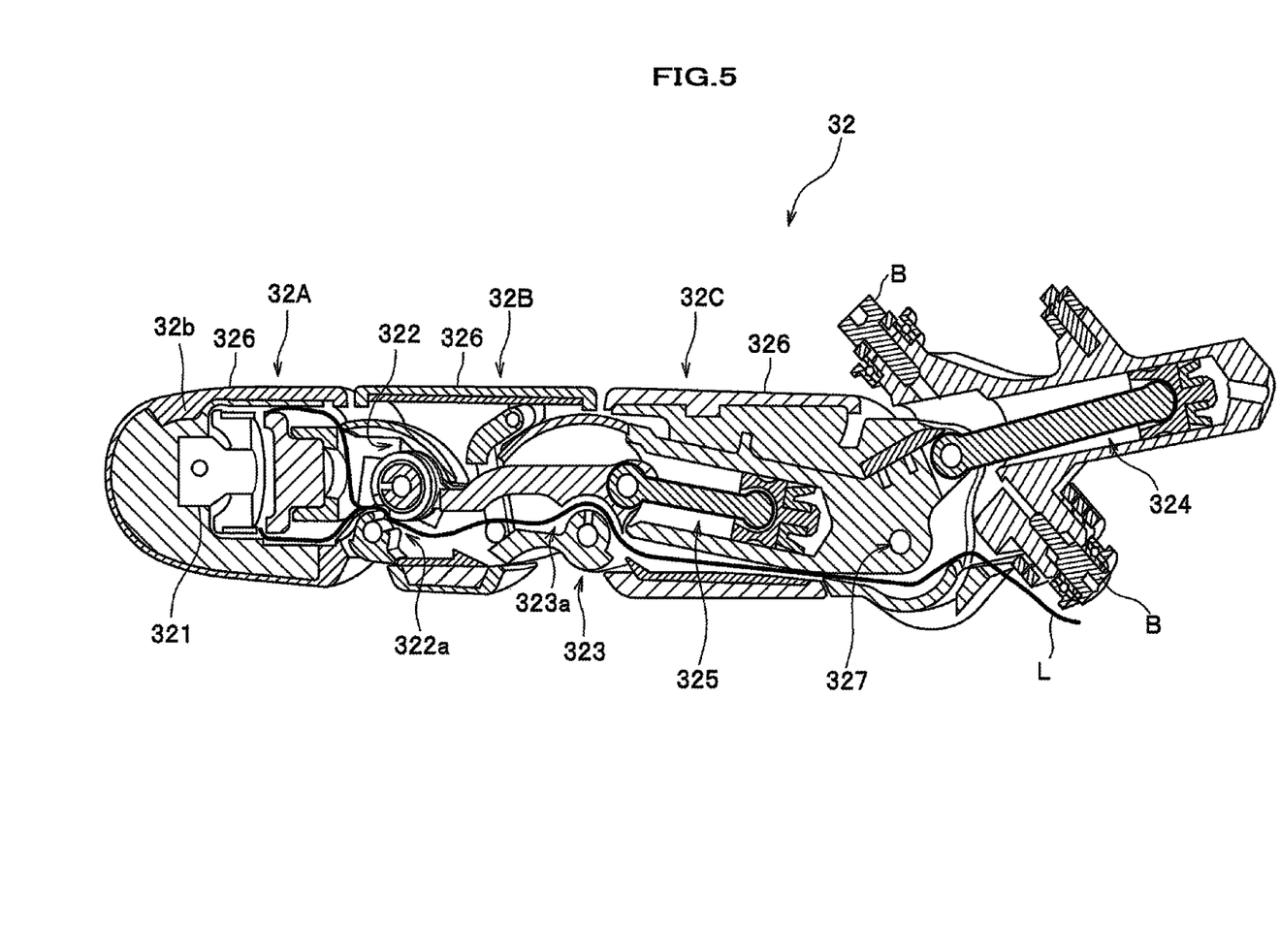
FIG. 5 is a cross section view showing an internal configuration of a finger mechanism of a multi-fingered type hand device according to the embodiment of the present invention.

The index finger mechanism 32 is divided into a first finger portion 32A, a second finger portion 32B, and a third finger portion 32C, and has a fingertip sensor 321, a first joint portion 322, a second joint potion 323, a first cylinder 324, a second cylinder 325, and a third joint portion 327 as shown in FIG. 5. The fingertip sensor 321, the first joint portion 322, the second joint potion 323, the first cylinder 324, and the third joint portion 327 in the index finger mechanism 32 are covered with an exterior member 326 as shown in FIG. 5.

The fingertip sensor 321 is adapted to detect a pressure applied from the outside. The fingertip sensor 321 is disposed on the first finger portion 32A being a distal end portion of the index finger mechanism 32 and detects the pressures inputted through the exterior member 326 as shown in FIG. 5. The fingertip sensor 321 may be provided on at least one of the finger mechanisms 30, that is, the fingertip sensor 321 may be provided on a finger mechanism 30 other than the index finger mechanism 32 or may be provided on each of the plurality of finger mechanisms 30. However, the fingertip sensors 321 must be provided on at least two of the finger mechanisms 30 when the multi-fingered type hand device 1 is used for holding objects.

The first joint portion 322 is adapted to rotate the first finger portion 32A. The first joint portion 322 is provided between the first finger portion 32A and the second finger portion 32B as shown in FIG. 5. The first joint portion 322 is adapted to rotate the first finger portion 32A by a predetermined angle in response to the first cylinder 324 and the second cylinder 325 being driven which are described later.

The second joint portion 323 is adapted to rotate the second finger portion 32B. The second joint portion 323 is provided between the second finger portion 32B and the third finger portion 32C as shown in FIG. 5. The second joint portion 323 is adapted to rotate the second finger portion 32B by a predetermined angle in response to the second cylinder 325 being driven which is described later. In addition, the third joint portion 327 is adapted to rotate the third finger portion 32C.

Here, around the first joint portion 322 and the second joint portion 323 are formed wiring paths 322a and 323a for a signal line L which connects the fingertip sensor 321 with the second substrate 24 (see FIG. 2) as shown in FIG. 5. In other words, on the first joint portion 322 and the second joint portion 323 are provided clearances of predetermined widths to be configured to allow an arrangement of the signal line L. As a consequence, the multi-fingered type hand device 1 is capable of shortening the length of the signal line L as much as possible by wiring the signal line L around the first joint portion 322 and the second joint portion 323, as well as the multi-fingered type hand device 1 can prevent the signal line L from interfering with other members inside of the finger mechanisms 30 by the signal line L being loosen when the first joint portion 322 and the second joint portion 323 are driven.

The first cylinder (finger mechanism hydraulic cylinder) 324 and the second cylinder (finger mechanism hydraulic cylinder) 325 are adapted to rotate the first joint portion 322, the second joint portion 323, and the third joint portion 327. Since publicly known cylinder mechanisms can be used for the first cylinder 324 and the second cylinder 325, a detailed explanation will be omitted.

As for the multi-fingered type hand device 1 with the above configuration, the first substrate 23 that controls the outputs of the three sensors and the second substrate 24 that converts the outputs of the three sensors to digital signals are all accommodated inside of the device. As a consequence, the multi-fingered type hand device 1 shortens the wirings which connect each member with each other, thereby facilitating the arrangements of the wirings. In addition, the multi-fingered type hand device 1 facilitates the arrangements of the wirings with members inside of the frame portion 21 by the configuration that the first substrate 23 and the second substrate 24 are disposed opposite to each other so as to sandwich the frame portion 21, as compared with a case, for example, where the first substrate 23 and the second substrate 24 are disposed overlapping with each other at the same side of the palm or the back of the hand.

The multi-fingered type hand device 1 accommodates therein members to reduce the thickness as well as a rigidity of the device is ensured by forming the frame portion 21 as outer frame-shaped. In addition, rigidities of mounting portions of four finger mechanisms 30 except the thumb mechanism 31 are improved with respect to the wrist portion 10 by forming the frame portion 21 as outer frame-shaped. In particular, a rotation moment is reduced when a force is applied to the index finger mechanism 32 or the little finger mechanism 35, and a rigidity is ensured against a force of x, y, and z-axes for the thumb mechanism 31.

In addition, the multi-fingered type hand device 1 firmly fixes the plurality of finger mechanisms 30 by supporting from the upper and lower the plurality of finger mechanisms 30 provided extending to the distal end of the base portion 20 with the first finger mechanism support portion 211 and the second finger mechanism support portion 212d, thereby preventing control errors, for example, caused by wobbling and the like.

The multi-fingered type hand device 1 facilitates the arrangements of the wirings because the members in the device are all disposed in a short distance, as well as the multi-fingered type hand device 1 prevents the noises from being mixed into the output values of the three sensors because the sensors and the substrate controlling the sensors are disposed close to each other.

The multi-fingered type hand device 1 according to the present invention has been explained in detail with embodiments for carrying out the present invention, however, the present invention is not limited to these descriptions, but must be broadly construed on the basis of descriptions in claims. Moreover, it is needless to say that various changes or modifications on the basis of these descriptions are also included in the present invention.

REFERENCE SIGNS LIST

1: multi-fingered type hand device
10: wrist portion
11, 26a, 26b, 326: exterior member
12: wrist sensor
20: base portion
21: frame portion
211: first finger mechanism support portion
212: main frame portion
212a: wrist frame portion
212b, 212c: side frame portion
212d: second finger mechanism support portion
23: first substrate
24: second substrate
25: tactile sensor
30: finger mechanism
31: thumb mechanism
32: index finger mechanism
32A: first finger portion
32B: second finger portion
32C: third finger portion
33: middle finger mechanism
34: ring finger mechanism
35: little finger mechanism
321: fingertip sensor
322: first joint portion
322a: wiring path
323: second joint portion
323a: wiring path
324: first cylinder (finger mechanism hydraulic cylinder)
325: second cylinder
327: third joint portion
B: fastening member
$H_1, H_2, H_3$: through bore
L: signal line
R: bent portion

The invention claimed is:

1. A multi-fingered type hand device comprising:
a wrist portion provided on a distal end side of an arm portion,
a base portion connected to the distal end of the wrist portion and provided inside an exterior of a hand, and
a plurality of finger mechanisms provided extending from a distal end of the base portion,
the wrist portion having therein a wrist sensor that detects a pressure from the outside,
at least one of the plurality of finger mechanisms having therein a fingertip sensor that detects a pressure from the outside,
the base portion including a frame-shaped frame portion, a tactile sensor accommodated inside the frame portion and detecting a contact pressure, a first substrate controlling output of the wrist sensor, output of the fingertip sensor, and output of the tactile sensor, and a second substrate,
the first substrate and the second substrate being disposed opposite to each other so as to sandwich the frame portion from the upper and lower.

2. The multi-fingered type hand device as set forth in claim 1, in which the frame portion includes:
a first finger mechanism support portion extending in a direction perpendicular to an extending direction of the plurality of finger mechanisms and supporting rear ends of the plurality of finger mechanisms from the upper side, and
a main frame portion which is in a frame shape and connected to both ends of the first finger mechanism support portion,
the main frame portion including:
a wrist frame portion which is in an annular shape and connected to a distal end of the wrist portion,
a pair of side frame portions extending in parallel with each other and in a direction of the plurality of finger mechanisms from the distal end of the wrist frame portion and respective distal ends of the side frame portions being connected to the corresponding ends of the first finger mechanism support portion, and
a second finger mechanism support portion extending in a direction perpendicular to the extending direction of the finger mechanisms to connect intermediate portions between the distal ends and rear ends of the pair of side frame portions with each other and supporting the rear ends of the finger mechanisms from the lower side of the finger mechanism,
the first substrate being disposed at a lower position than an upper end of the main frame, and the second substrate being disposed at a higher position than a lower end of the main frame.

3. The multi-fingered type hand device as set forth in claim 2, in which one of the pair of side frame portions is formed bent upward at the end portion side of the wrist frame portion.

4. The multi-fingered type hand device as set forth in claim 1, in which the finger mechanism includes a plurality of joint portions,
around the plurality of joint portions being formed wiring paths for a signal line that connects the fingertip sensor with the second substrate, and the signal line being wired along the wiring paths.

* * * * *